Nov. 11, 1958 G. J. DERRIG 2,859,990
RAILING STRUCTURE
Filed Feb. 19, 1954
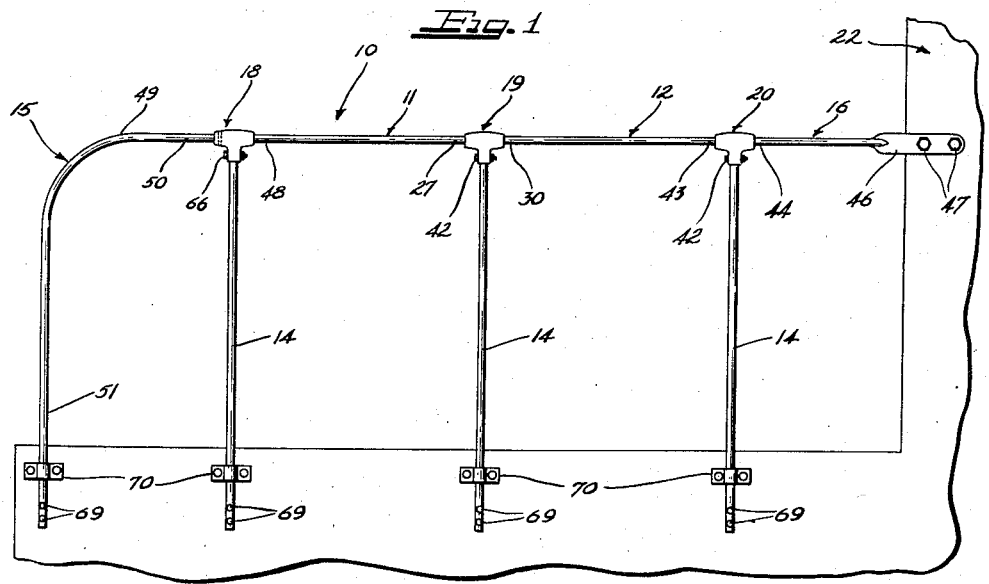
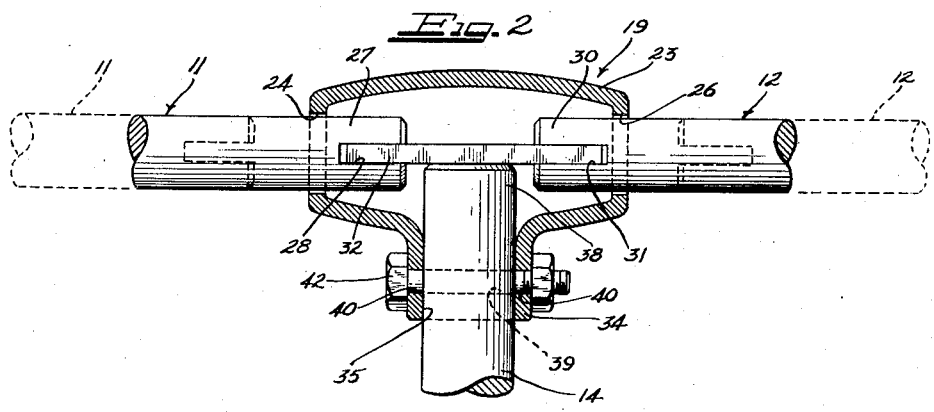
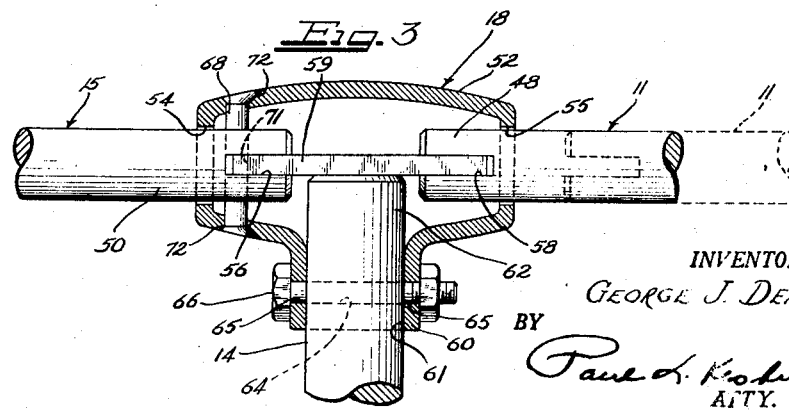
INVENTOR.
GEORGE J. DERRIG
BY
Paul L. Kohn
ATTY.

United States Patent Office 2,859,990
Patented Nov. 11, 1958

2,859,990

RAILING STRUCTURE

George J. Derrig, Park Forest, Ill., assignor to Fairbanks, Morse & Co., Chicago, Ill., a corporation of Illinois Application February 19, 1954, Serial No. 411,473

5 Claims. (Cl. 287—54)

This invention relates to improvements in guard railing, and more particularly to an improved guard railing structure of a character to afford quick and easy mounting assembly thereof, and to permit ready disassembly of any part or section of the railing without substantial disturbance or removal of other sections of the railing.

In the construction and installation of hand or guard rails and the like, it is common practice to join or couple the rail portions by welding, threaded joints, or in some cases riveting the various parts one to the other. Such methods are utilized to obtain a strong and rigid railing, and to result in a structure of a somewhat permanent nature. Railings of such acharacter ordinarily require considerable time and effort to construct and install and are difficult to repair in the field. In some instances such railings are so permanent or difficult to repair that when repairs are required, it is necessary to replace the entire railing structure.

With the foregoing in view, it is an important object of the present invention to provide a hand or guard rail assembly sufficiently strong and rigid to function as a permanent railing, and yet so constructed as to permit quick and easy dismantling thereof, either in whole or in part.

Another important object of the invention is the provision of novel coupling means which effectively retain the railing members in secure assembly and in a manner which does not require the members to be permanently joined.

A further object of the invention is to provide improved end-to-end connections for the horizontal rail members, wherein the rail ends are formed with slots which are aligned to receive bridge or spacer plates, and wherein the connections are interdependent in firm support of the structure.

A still further object of the invention is to provide improved coupling means for effecting ready, detachable mounting connection of the horizontal rails in end-to-end connection, with vertical posts or standards.

According to the general features of this invention and in one embodiment thereof, a T-shaped coupling member of tubular construction is utilized for joining the horizontal rails and the vertical standards. The main or horizontal portion of the coupling has open ends to provide aligned openings for receiving the ends of an adjacent pair of horizontal rails or rods. The rails are formed with slotted ends for the reception of a flat elongated member or spacer plate disposed therebetween, thereby affording an end-to-end connection of the rails. In a series of such couplings, each thereof in effecting the end-to-end connection indicated, is dependent on the other couplings for preventing relative withdrawal of the rails, while the extreme end or terminating rails must be secured in a positive manner to prevent relative horizontal movement of the intervening rail members.

The coupling is also formed to provide a lateral or stem portion, which receives a vertical rail support rod or standard. The spacer plate used in effecting the described end-to-end horizontal rail connection, is positioned, preferably in a horizontal plane in the coupling and provides an abutment or stop for the inserted end of the standard, thereby preventing rotary or twisting movement of the rails. By suitable means, such as bolting, the coupling stem portion is secured to the standard, thereby maintaining the various members in the relative positions as described. In assembly, the standards and extreme end rails are suitably positively secured to the frame or base structure with which the guard-railing is to be employed.

Further objects, features, and advantages of this invention will appear or become apparent to one skilled in the art from the following description, reference being made to the accompanying drawings in which:

Fig. 1 is an elevational view of one form of hand or guard rail structure constructed according to the teaching of the present invention.

Fig. 2 is an enlarged vertical sectional view taken through the middle tubular coupling member of Fig. 1, with parts broken away and showing the interrelation of the associated railing members in connection effected by the coupling.

Fig. 3 is an enlarged vertical sectional view taken through the end coupling at the left end of the rail assembly as viewed in Fig. 1, with parts broken away.

Referring now to the drawings, the reference numeral 10 indicates in general a hand or guard rail assembly having horizontal rails 11 and 12, vertical rail standards 14, and end rails 15 and 16. At the points of juncture between the rails and the standards, there are provided T-shaped couplings 18, 19 and 20 which, in a manner to be described, retain the rail members in end-to-end connection and also secure the rail members to the standards. For purposes of illustration, the presently improved guard rail assembly is shown in operative association with a stepped or irregular portion generally indicated by the numeral 22, of a relatively stationary body, base or frame which may serve to define a walk-way, as a loading platform, locomotive catwalk, etc. with which the hand rail assembly 10 is to be employed.

Fig. 2 illustrates in enlarged vertical section longitudinally through the coupling, the T shaped coupling member 19 intermediate in the series of couplings shown in Fig. 1. Said coupling is of tubular construction and is formed with a main or longitudinal portion 23, having open ends to provide aligned openings 24 and 26 for the insertion of end portions of horizontal rails 11 and 12. Said rails are formed with slotted ends and, as shown in Fig. 2, one end 27 of rail 11 provided with the slot 28, is inserted through the coupling opening 24, while end 30 of rail 12 provided with slot 31, is inserted through the coupling opening 26. A flat elongated coupling element or spacer plate 32 disposed between the rail ends, seats in said slots, thereby providing an end-to-end connection of the horizontal rails 11 and 12. Said spacer plate holds the rails in alignment, and is of such length relative to the depth of the rail slots into which it fits, that the opposed rail ends are spaced a considerable distance apart within the hollow coupling member, as substantially to the extent shown in Fig. 2.

The coupling is also formed to provide a stem portion 34 normal to the horizontal coupling section, with the stem having an opening 35 therein, adapted to receive the upper end of a vertical support rod or standard 14. The spacer plate 32 used in effecting the described end-to-end connection, is positioned in a horizontal plane as shown, so that upon insertion of the standard 14 through the opening 35, the end 38 of the latter will abut the flat under side of spacer plate 32 in firm frictional engagement therewith. When the standard 14 is properly positioned, i. e., firmly abutting spacer plate 32, a transverse bore 39 through the standard is in alignment with diametrically opposite bores 40 formed in the stem portion 34, and a bolt 42 is then passed therethrough to secure the coupling to the standard, thereby maintaining the associated members in the relative positions as shown. When so bolted to the standard, the coupling member coacts with the associated hand rails in the region of the opposed ends thereof, to constrain the coupling element or plate 32 to firm frictional contact with the end of the standard. Also, since the end of the standard abuts the flat side of the coupling element, it precludes turning of the element and hence, any turning or rotary movement of the connected hand rails.

Since in the present coupling device, the coupling element or spacer plate 32 has its ends freely engaged in the slots of the opposed ends of the associated rails, provision is made to hold the plate ends against lateral displacement from the slots. This is accomplished in the present embodiment, by providing the tubular coupling member of a size relative to the width of the spacer plate 32, and particularly at the ends of the coupling member which surround the slotted ends of the associated hand rails, so that the walls of the coupling member will adequately confine or constrain the ends of the plate member against displacement laterally from the rail slots.

Referring to Fig. 1, it can be seen that whereas one slotted end 30 of horizontal rail 12 is retained in coupling 19, the opposite slotted end 43 of said rail is retained in coupling 20. Also retained in coupling 20 is one end 44 of the end rail 16, said end being slotted in a manner similar to that of rail end 30. The coupling 20 preferably is identical in construction to the coupling 19, and provides an end-to-end connection between the horizontal rail 12 and the end rail 16. Likewise, the coupling 20 is secured to a standard 14 in the same manner as coupling 19 is secured to its associated standard. It is to be noted that the end rail 16 may be formed to have a flattened end portion 46 adapted for attachment to the body member 22, as by bolts 47.

Also, and as shown in Fig. 1, the horizontal rail 11 has one slotted end 27 inserted in the coupling 19, while the other slotted end 48 of said rail is inserted in the coupling 18. The end rail 15 in the present example, has one end 50 retained in the coupling 18, and is formed to provide both a horizontal hand rail portion 49 and a vertical or standard portion 51. The angular end rail 15 thus serves both as a horizontal hand rail and as a standard. Hence, whenever it is necessary to extend the hand railing to or adjacent an open space such as at the end of a walk-way, platform, stairway, catwalk, etc., or in any instance in which the railing terminates at a point of the body or frame such as 22 where use of a terminating rail such as end rail 16, is precluded, then an angular rail such as end rail 15, may be used.

Referring now to Fig. 3, there is shown an enlarged vertical sectional view taken through the coupling member 18 which houses the horizontal end portion 50 of the end rail 15. The coupling is of tubular construction and is formed with a main or horizontal portion 52, having open ends to provide aligned openings 54 and 55 for the insertion of rail ends 50 and 48, respectively. As shown, the rail end 50 is provided with a slot 56 and the rail end 48 is provided with a slot 58 and a spacer plate or coupling element 59 disposed therebetween, seats in the slots to provide an end-to-end connection of the rails. The coupling is also formed to provide a vertical stem portion 60 having an opening port 61 therein adapted to receive the end portion 62 of a standard 14. Upon insertion of the standard 14 through the opening 61, the end portion 62 abuts the spacer plate 59, and when so abutting, a transverse bore 64 through the standard is then in alignment with diametrically opposite bores 65 formed in the stem portion 60, thus permitting securement of the coupling to the standard by means of a bolt 66 passed through said aligned bores.

As thus far described, it is apparent that the coupling 18 is like the couplings 19 and 20. However and as shown in Fig. 3, it differs from the other couplings only in that the end rail 15 is secured to the coupling by means of a pin 68 extending transversely through the rail end 50 and having its ends fixed to the coupling 18 in any suitable manner, such as by swedging the pin ends in the pin-receiving openings 72 of the coupling body. Thus the pin prevents withdrawal of the rail end 50 from the coupling 18. It is to be noted that the spacer plate 59 is suitably notched or cut-away, as at 71, so as not to interfere with or be secured by the cross-pin 68.

It should be noted that the three coupling devices 18, 19 and 20, are fabricated and function in the same manner, i. e., spacer plates or coupling elements interposed between the adjacent horizontal rail ends, seat in the slots formed in said rail ends, thereby aligning the horizontal rails and providing a series of end-to-end rail connections. It is apparent from the nature of these connections that, so long as each spacer plate remains seated in its respective rail slots a continuous horizontal hand railing is effected.

Referring once again to Fig. 1, the standards 14 and the vertical portion 51 of end rail 15 are attached to the base or walk-way structure 22 by means of mounting bolts 69 and U-shaped brackets or straps 70. The bolts 69 are effective to prevent vertical movement of the standards, while the brackets 70 retain the standards against the lateral movements and function as guides for the standards during rail assembly or in dismantling of the hand rail structure in whole or in part.

As previously noted, the assembly of a hand rail utilizing the type of coupling herein illustrated, is dependent upon preventing withdrawal of the individual horizontal rails from their respective couplings. It is apparent then, that the couplings are interdependent in assembly, and hence horizontal movement of the rails must be restricted to prevent rail withdrawal. This is acomplished in part as with end rail 16, by securing said end rail to the base or walk-way structure 22. However, when it is necessary to terminate the hand rail adjacent an open space, as in the case of the end rail 15, it is necessary to secure the end rail to its coupling, as by pin 68, Fig. 3. Since the coupling is fixed to a vertical standard that is more-or-less rigidly mounted, lateral movement of the end rail is prevented. It is apparent that with the terminating or end rails suitably secured, the intermediate rails comprising the series of end-to-end rail connections, are restricted against relative horizontal movement. Vertical and sidewise movements of the horizontal hand rail are effectively restrained by virtue of the couplings in which the end-to-end rail connections are confined, and the fixed mounting of each coupling on a standard or support rod.

It is obvious that this particular construction of hand rail is maintained in assembly by interdependence of the various parts, and it is this dependent relation of members that facilitates quick and easy assembly or dismantling. For example, should it be desired to replace the particular standard 14 which is secured to coupling 19, it is only necessary to remove the bolt 42 and the respective mounting bolts 69, thus freeing the standard for removal. Though the coupling 19 is now free from support, the spacer plate 32 is adequate to maintain the end-to-end connection between rails 11 and 12. Thus removal of a standard can be effected in a simple manner while the remainder of the hand rail assembly remains substantially intact, and a new standard may then be inserted and secured. It can be seen that any or all of the standards 14 can be removed in this manner.

Should it become necessary to replace one of the intermediate horizontal rails as 11 or 12, a similar procedure is followed. That is, removal of the standard 14 supporting coupling 19 is effected in the manner above described. The coupling then being free for movement longitudinally along either rail 11 or 12, is displaced from its position encircling the end-to-end connection, and the spacer plate 32 then is removed by sidewise or lateral displacement from its engagement in the slots of the rail ends. If the rail 11 is to be removed, it requires only that rail end 48 be withdrawn from its coupling 18, the abutting action of standard end 62 against spacer plate 59 being sufficient to restrict movement or play of the spacer plate during this removal. Likewise, removal of rail 12 would be accomplished by withdrawing the rail end 45 from its coupling 20. A new rail or rails could then be assembled in place of those removed, as by reversing the described procedure.

It should be noted that although the hand rail assembly includes interdependent coupling members, removal of any one rail member is not sufficient of itself to preclude functioning of the remaining structure as a hand rail. Thus, should a horizontal rail, for example rail 11, be broken or otherwise removed from its position in assembly, the remaining members will still function as a hand rail until replacement of the broken part is made. Referring to Figs. 1 and 2, it can be seen that even if rail 11 were to be withdrawn from the coupling 19, so long as the coupling remains bolted to the standard 14 the standard end 38 is disposed in a position that permits only a limited horizontal movement of the rail 12. Likewise, and as before indicated, the mere removal of one standard from its position of support, will not of itself cause the horizontal hand rail portion to become ineffective, so long as the coupling remains disposed about the end-to-end connection to prevent lateral or sidewise movement of the spacer plate.

The present improved guard or hand rail assembly presents a strong and rigid structure equivalent in effect, to heretofore prevailing permanent types of rail construction. Horizontal movement of the hand rails is prevented by the series of end-to-end connections and the fact that the terminating rails are positively secured. Vertical movement of the railing is prohibited by fixing the couplings to support standards, and in so retaining the couplings, sideways movement of the railing and the spacer plates is restricted. Twisting or turning of the individual hand rail elements is effectively eliminated by the abutting of the standard end against the flat side of the spacer plate, and the standard itself is rigidly held by the cooperative action of the straps and mounting bolts.

The hand rail, as described, is adequate to function as a permanent hand rail and yet because of the nature of the couplings employed, the structure can be assembled, or dismantled in whole or in part, quickly and easily. The simplicity of construction and the fact that the various members do not have to be formed with precision nor within close tolerances, makes the present improved hand rail assembly economical as well as efficient.

While the foregoing specification sets forth the invention in specific terms, it is to be understood that variations and modifications may be resorted to without departing from the broad aspects of the invention as defined by the following claims.

Having now described the invention, what is claimed is:

1. In a guard rail assembly, a hollow coupling member, a pair of hand rails in end-to-end relation with the opposed ends thereof in said coupling member, each of said opposed ends providing a slot therein, a spacer element having its ends freely received in the slots of the opposed rail ends within the coupling member and disposing said rail ends in spaced apart relation therein, a rail standard having one end in frictional abutment with said spacer element, and attachement means securing said coupling member to said one end of the standard.

2. In a guard rail structure, a hollow coupling member having openings in alignment longitudinally of the member and providing a lateral opening, a pair of hand rails in end-to-end relation, with the opposed ends thereof extending in the coupling member through said aligned openings, each of said opposed ends providing a slot therein, a coupling element having its ends freely received in the slots of said opposed rail ends and constraining the opposed ends of the hand rails to a spaced apart relation in said coupling member, a rail standard having an end portion thereof extending into the coupling member through said lateral opening, to frictional abutment with said coupling element, and means detachably securing said coupling member to said standard.

3. A railing for a walk-way structure, comprising end and intermediate hand rails in end-to-end relation, means detachably securing the end rails to the walk-way structure, the opposed ends of each adjacent pair of hand rails each providing a slot therein, a coupling element having its ends freely received in the slots of the opposed ends of each adjacent pair of said hand rails and disposing the opposed rail ends in spaced apart relation, each coupling element having a flat side, a plurality of rail standards detachably secured to the walk-way structure, each standard providing a flat end for abutment with the flat side of one of said coupling elements, and a coupling member removably secured to each standard and coacting with the hand rails adjacent the standard, to constrain the associated coupling element to abutment of its flat side with the flat end of the standard.

4. In a railing structure including a pair of hand rails in end-to-end relation and a rail standard, a coupling device for coupling the opposed ends of said hand rails and connecting the coupled ends of the rails to said standard, said coupling device comprising a hollow coupling member having openings in alignment longitudinally of the member and providing a laterally extending, open stem, said opposed ends of the hand rails each being longitudinally slotted and extending in the hollow coupling member through said aligned openings, a rigid coupling element within the hollow member, having its ends freely received in the slots of the opposed ends of the hand rails and constraining said rail ends to a spaced apart relation therein, said coupling element having one flat side facing said open stem of the coupling member, one end of said standard extending in the hollow coupling member through said open stem thereof, and providing a flat terminal surface in abutment with said one flat side of the coupling element therein, a detachable connection between the standard and said stem securing said coupling member to said standard such as to constrain said coupling element to frictional abutment of its said one flat side with said flat terminal surface at said one end of the standard, and means securing one of said hand rails to said coupling member.

5. A railing for a walk-way structure, comprising end and intermediate hand rails in end-to-end relation, means detachably securing the end hand rails to the walk-way structure, the opposed ends of each adjacent pair of said hand rails each having a slot therein opening to the terminal end of the rail, a hollow tubular coupling member for each adjacent pair of hand rails, having aligned openings receiving the opposed ends of the associated pair of hand rails, a rigid, flat elongate coupling element of a generally rectangular form in each coupling member, having its ends in free seating engagement in the slots of the opposed rail ends therein and serving to space apart said opposed rail ends within the coupling member, said coupling element having a transverse dimension such that the side edges thereof are spaced from but positioned closely adjacent to the interior wall of said tubular coupling member in order to confine the coupling element within the coupling member against displacement of its ends laterally from said rail slots, a plurality of rail standards one for each of said coupling members, removably secured to the walk-way structure, each of said coupling members providing a laterally extending open stem for receiving the upper end portion of the associated rail standard, the upper end portion of each standard providing a flat terminal end, said railing and rail standards in assembly, having the said upper end portion of each standard projected through the open stem of the associated coupling member with the flat terminal end of the standard abutting one flat side of the coupling element in the coupling member, and a securing connection between the stem of each coupling member and the associated rail standard, effective for constraining the coupling element to frictional abutment at said one flat side thereof with said flat terminal end of the associated standard.

References Cited in the file of this patent

UNITED STATES PATENTS

| | | |
|---|---|---|
| 444,960 | Priday | Jan. 20, 1891 |
| 853,810 | Lindenschmidt | May 14, 1907 |
| 1,568,510 | Kwasigroch | Jan. 5, 1926 |
| 2,018,250 | Cohan | Oct. 22, 1935 |
| 2,090,863 | Feykert | Aug. 24, 1937 |
| 2,117,798 | Gascoigne et al. | May 17, 1938 |
| 2,517,959 | Baldwin | Aug. 8, 1950 |